Figure 1:
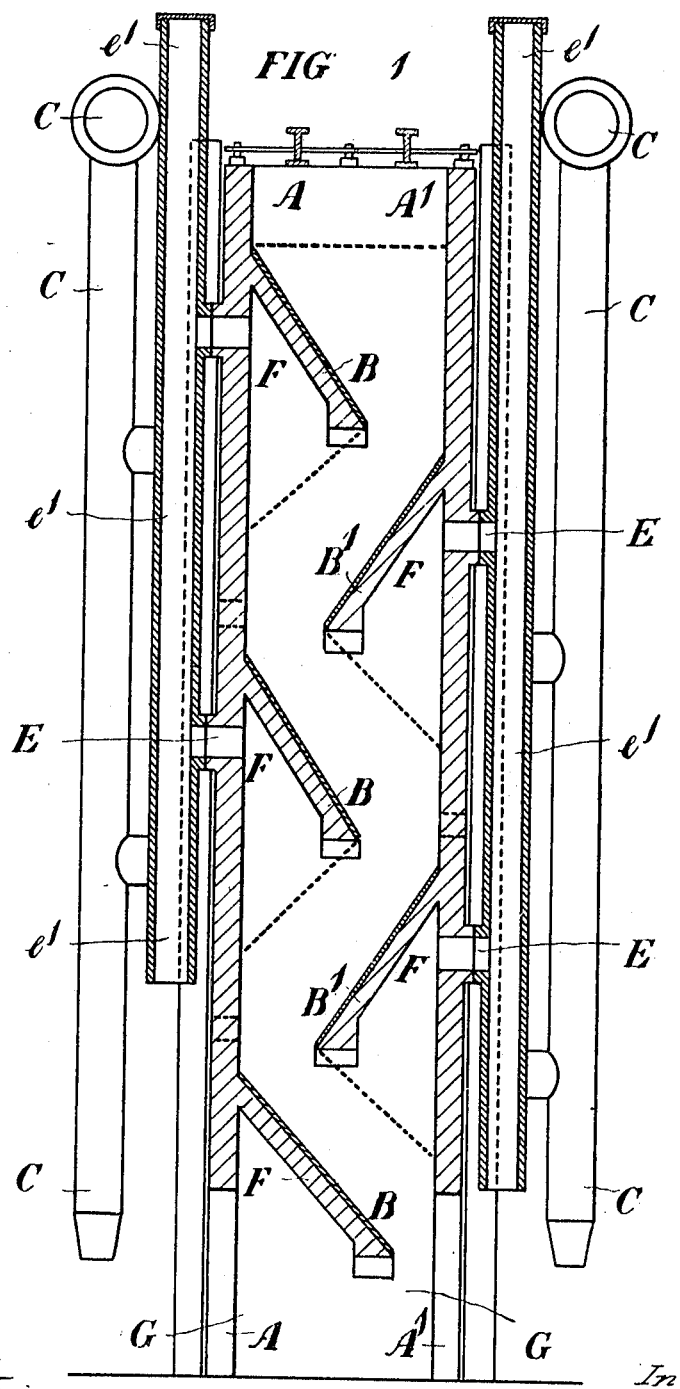

W. J. WILLIS.
CALCINING KILN.
APPLICATION FILED OCT. 25, 1909.

969,931.

Patented Sept. 13, 1910.
4 SHEETS—SHEET 1.

Inventor:
William J. Willis

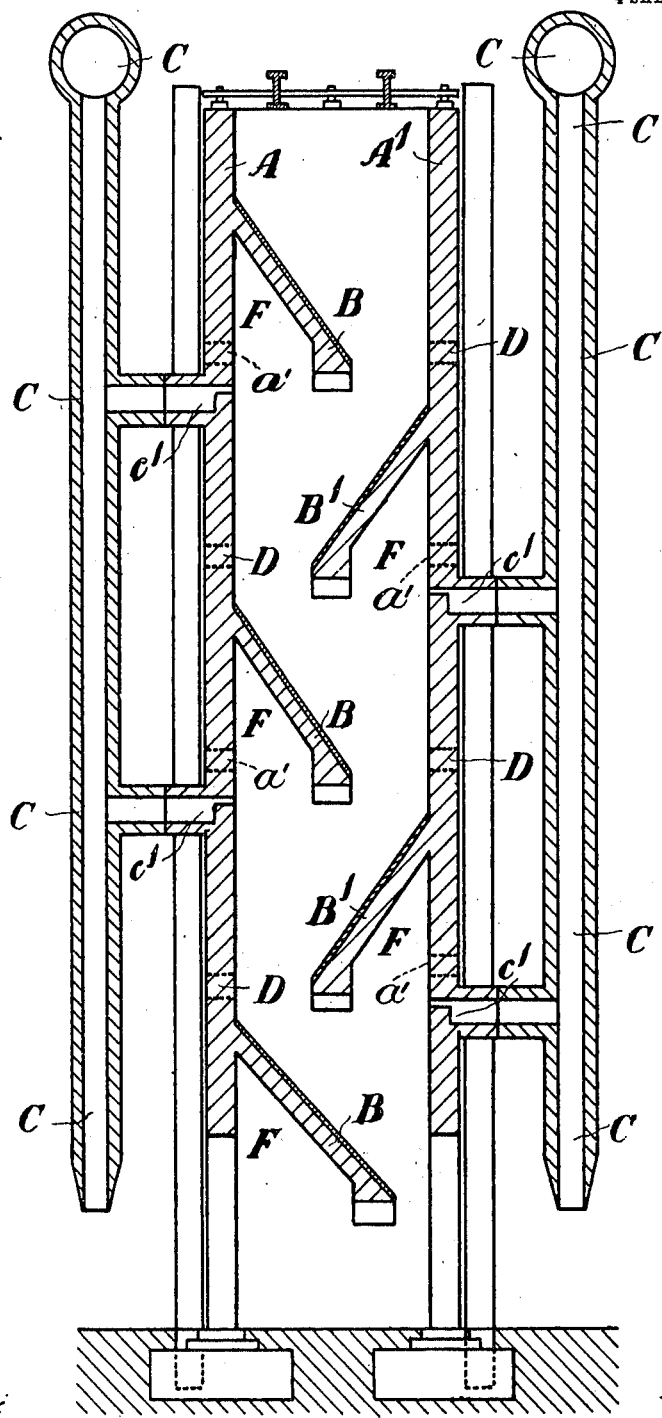

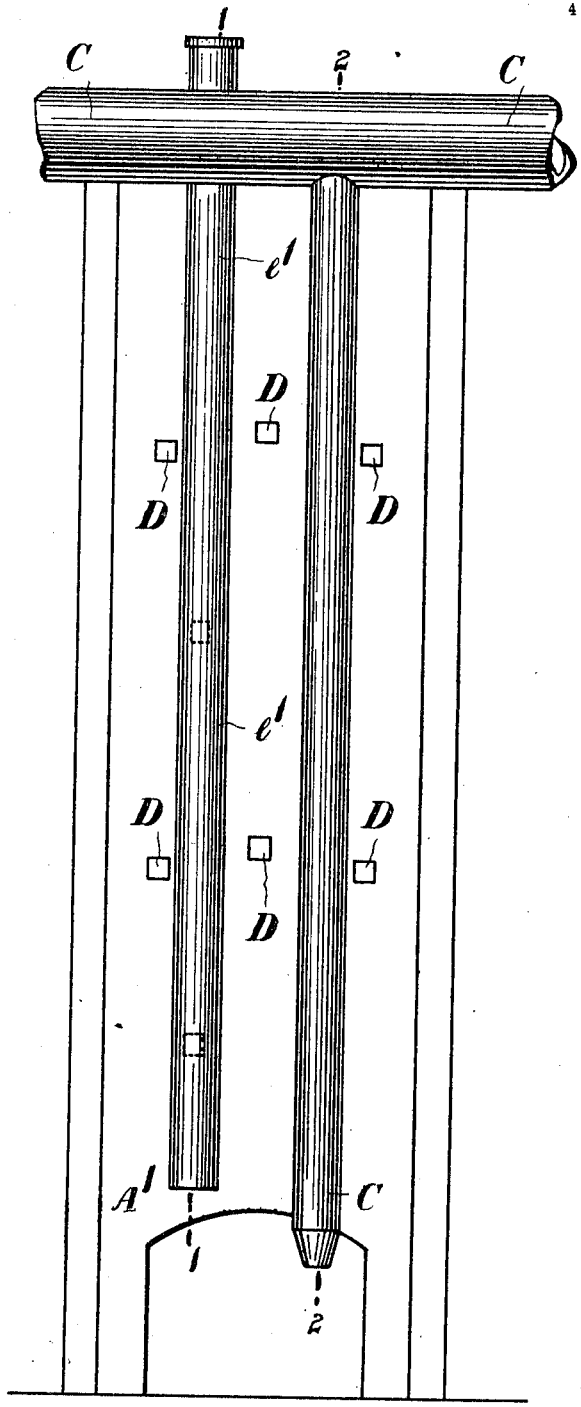

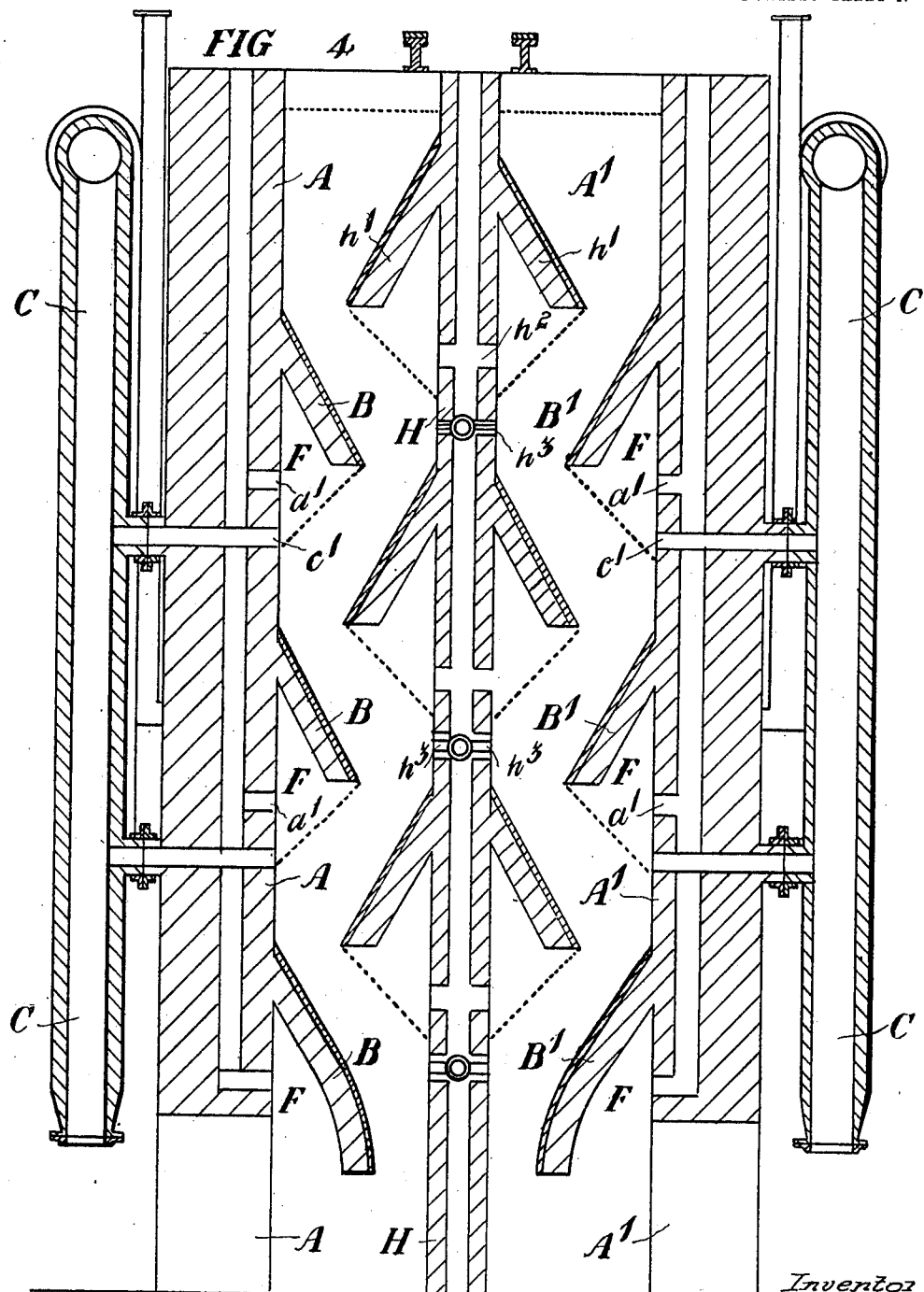

UNITED STATES PATENT OFFICE.

WILLIAM JOHN WILLIS, OF OCKER HILL, ENGLAND.

CALCINING-KILN.

969,931.  Specification of Letters Patent.  Patented Sept. 13, 1910.

Application filed October 25, 1909.  Serial No. 524,524.

*To all whom it may concern:*

Be it known that I, WILLIAM JOHN WILLIS, a citizen of Great Britain, and a resident of Richmond House, Ocker Hill, in the county of Stafford, England, have invented certain new and useful Improvements in Calcining-Kilns, of which the following is a specification.

This invention relates to improvements in calcining kilns and refers particularly to such kilns as may be used for roasting or calcining ironstone, limestone, etc., for the purpose of getting rid of volatile substances, such as water and carbonic acid and sulfur, decomposition of iron pyrites, etc., and the transformation of protoxid of iron into ferric oxid.

The invention applies to all gas fired kilns and is particularly intended for such as are fired by blast furnace gas.

The invention consists in the provision of inclined plates or beds projecting on each wall and alternating with each other and being oppositely inclined, the arrangement causing the stone to pile and gradually fall from incline to incline down the kiln in what might be termed "cascade" fashion. Each incline is substantially the same in contour on the underside as well as the upper and as the stone fall at its natural angle or slope, it cuts off a space or pocket under each incline.

The firing gas is introduced near the bottom of the furnace and the pockets or spaces formed by the stone on the inclines, form effective combustion spaces where the gas may burn in presence of air and exert its heating effect direct on the stone. The gases issue at the top and preferably escape apertures are formed just beneath each incline. At each of such pockets up the kiln side subsidiary gas and air inlets may be provided and by suitable controls the calcining process may be conducted so as to give the best results. The stone falling down the inclines brings a fresh surface toward each succeeding pocket or space so that greater rapidity of calcination is achieved.

Suitable arrangements will be made for charging the stone into the kiln, such as trucks on tracks which can run over the kilns and tip into same and suitable means for removing the calcined ore will also be provided.

In order that the invention may be thoroughly understood and easily carried into practical effect, I have appended hereunto four sheets of drawings illustrating the same.

Figure 1, is a vertical section of a kiln constructed in accordance with the invention, the section being taken on line 1—1 of Fig. 3. Fig. 2, is a similar section taken on line 2—2 of Fig. 3. Fig. 3, is an elevation. Fig. 4, is a vertical section of a kiln with a central divisional wall made in accordance with the invention.

On these drawings A, $A^1$ represents the walls of the kiln and B, $B^1$, the inclined projections. The projecting inclined beds B project downwardly from the wall A at a slope sufficient to insure ready feeding down the kiln of the material to be calcined. The projecting beds $B^1$ similarly incline from wall $A^1$ and are spaced so as to come substantially mid-way between the beds B. Each set of inclined beds project toward the central vertical plane of the kiln.

The gas is led in by mains C and passages $c^1$ on each side as shown at Fig. 2, and air inlets $a^1$ are provided in the side walls adjacent to the gas inlets. Gas outlets E may be provided at or near the top of the underside of each inclined bed leading into pipes $e^1$. Poking holes D are provided where required.

The material to be calcined is dumped into the kiln in the ordinary way and falls from bed to bed down the kiln as represented by the dotted lines at Fig. 1. As will be seen the material leaves spaces or pockets F beneath the beds where the gas readily burns in contact with air and exerts a powerful heating effect on the top of each fall of stone, which with the gases passing up the kiln from each gas and air inlet to the outlets through the material effects a regular and thorough heating. Further as the stone rolls down the successive inclines it is constantly changing over and over and presenting different surfaces to the hot gases and great rapidity of calcination is obtained. The calcined material is removed at the bottom of the kiln at G in the ordinary manner.

At Fig. 4, the kiln has a central dividing wall H from each side of which inclined beds $h^1$ project alternating with the beds B, $B^1$ on the side walls so that in effect two calcining chambers are formed. $h^2$ and $h^3$ are the air and gas inlets in the central wall and the operation is similar in chamber to that in the kiln shown at Figs. 1, 2, and 3.

The invention is also applicable to ordinary kilns as well as those heated by the combustion of the gasified fuel. In ordinary kilns with the fuel mixed with the material to be calcined the same cascade arrangement can be used.

What I claim then is:

1. A calcining kiln wherein inclined portions project from one side wall and oppositely inclined portions project from the opposite side wall at intermediate points so that the inclined portions are alternately disposed up the kiln, together with air inlets and gas inlets in each side wall at levels near or adjacent to the bottom edge of each inclined projecting portion.

2. A calcining kiln comprising in combination, inclosing walls forming a passage for the material, inclined shelves projecting from said walls into the passage, and independent fuel inlets communicating with said passage at points beneath said shelves.

3. A calcining kiln comprising in combination, inclosing walls forming a passage for the material, inclined shelves projecting from said walls into said passage, and independent fuel inlets in the walls from which said shelves project communicating with said passage from beneath said shelves.

4. A calcining kiln comprising in combination, inclosing walls forming a passage for the material, inclined shelves projecting from said walls into said passage, and independent fuel and air inlets communciating with said passage at points beneath said shelves.

5. A calcining kiln comprising in combination, inclosing walls forming a passage for the material, inclined shelves projecting from said walls into said passage, and fuel and air inlets communicating with said passage from beneath said shelves and outlets from beneath said shelves.

6. A calcining kiln comprising in combination, inclosing walls forming a passage for the material, inclined shelves projecting from said walls into said passage, independent fuel and air inlets communicating with said passage from beneath said shelves, and outlets located above said inlets and beneath said shelves.

7. A calcining kiln comprising in combination, inclosing walls forming a passage for the material, inclined shelves projecting into said passage to cause the material to cascade from one shelf to the other into the passage, and independent fuel inlets communicating with said passage at spaced points throughout its length.

8. A calcining kiln comprising in combination, inclosing walls forming a passage for the material, and inclined shelves projecting into said passage to cause the material to cascade from one shelf to the other into the passage, and independent fuel and air inlets communicating with said passage at spaced points throughout its length.

9. A calcining kiln comprising in combination, inclosing walls forming a passage for the material, and inclined shelves projecting into said passage to cause the material to cascade from one shelf to the other into the passage, independent fuel inlets communicating with said passage at spaced points throughout its length, and independent outlets for said inlets.

10. A calcining kiln comprising in combination, inclosing walls, a partition dividing the space between said walls into separate passages, inclined shelves projecting from said walls into said passages, and inclined shelves projecting from said partition into said passages, and fuel inlets communicating with said passages through said partition.

11. A calcining kiln comprising in combination, inclosing walls, a partition dividing the space between said walls into separate passages, inclined shelves projecting from said walls into said passages, and inclined shelves projecting from said partition into said passages, and fuel and air inlets communicating with said passages through said partition.

12. A calcining kiln comprising in combination, inclosing walls, a partition dividing the space between said walls into separate passages, inclined shelves projecting from said walls into said passages, and inclined shelves projecting from said partition into said passages, and a plurality of independent fuel and air inlets communicating with said passages through said partition.

Signed at Birmingham in the county of Warwick, England this seventh day of October A. D. 1909.

WILLIAM JOHN WILLIS.

Witnesses:
J. BEAUMONT PERCIVAL,
E. DAWSON HARDCASTLE.